United States Patent
Aoki et al.

(10) Patent No.: US 12,459,025 B1
(45) Date of Patent: Nov. 4, 2025

(54) METHOD OF MANUFACTURING MOLDED PRODUCT

(71) Applicant: FUTABA INDUSTRIAL CO., LTD., Okazaki (JP)

(72) Inventors: Satoshi Aoki, Okazaki (JP); Fuka Minami, Okazaki (JP)

(73) Assignee: FUTABA INDUSTRIAL CO., LTD., Okazaki (JP)

( * ) Notice: Subject to any disclaimer, the term of this patent is extended or adjusted under 35 U.S.C. 154(b) by 0 days.

(21) Appl. No.: 19/177,002

(22) Filed: Apr. 11, 2025

(30) Foreign Application Priority Data

May 1, 2024 (JP) ................. 2024-074375

(51) Int. Cl.
*B21D 22/20* (2006.01)
*B23K 28/00* (2006.01)
*B32B 7/05* (2019.01)
*B32B 15/01* (2006.01)

(52) U.S. Cl.
CPC .............. *B21D 22/20* (2013.01); *B23K 28/00* (2013.01); *B32B 7/05* (2019.01); *B32B 15/011* (2013.01)

(58) Field of Classification Search
CPC .......... B21D 22/20; B23K 28/00; B32B 7/05; B32B 15/011
See application file for complete search history.

(56) References Cited

U.S. PATENT DOCUMENTS

| | | | | |
|---|---|---|---|---|
| 11,865,809 B2 * | 1/2024 | Matsen | ................ | B23K 20/008 |
| 12,115,592 B2 * | 10/2024 | Ninnemann | ........... | B23K 11/16 |
| 12,134,458 B2 * | 11/2024 | Heeringa | ................. | B64F 5/10 |
| 2019/0358731 A1 * | 11/2019 | Ninnemann | ........... | B23K 11/06 |
| 2021/0101365 A1 * | 4/2021 | Matsen | ................. | B23K 20/02 |
| 2024/0017812 A1 * | 1/2024 | Heeringa | ................. | B32B 3/28 |

FOREIGN PATENT DOCUMENTS

JP     2023102761 A  *  7/2023

* cited by examiner

*Primary Examiner* — Lawrence Averick
(74) *Attorney, Agent, or Firm* — Withrow + Terranova, PLLC; Vincent K. Gustafson (57) ABSTRACT

A method of manufacturing a molded product is provided. The method of manufacturing a molded product includes forming a first joining portion by placing an inner metallic plate and an outer metallic plate on each other and welding them together; bending, after forming the first joining portion, the outer metallic plate with the inner metallic plate in a first direction by performing a first press working; and forming, after the first press working, a first surface, a second surface, and a curved portion on the outer metallic plate by performing a second press working. In the second press working, the outer metallic plate is bent with the inner metallic plate in a second direction to form an oppositely curved portion which is bent in a direction opposite from a bending direction of the curved portion on the outer metallic plate.

5 Claims, 8 Drawing Sheets

METHOD OF MANUFACTURING MOLDED PRODUCT

CROSS-REFERENCE TO RELATED APPLICATIONS

This application claims the benefit of Japanese Patent Application No. 2024-074375 filed on May 1, 2024 with the Japan Patent Office, the entire disclosure of which is incorporated herein by reference.

TECHNICAL FIELD

The present disclosure relates to a method of manufacturing a molded product.

BACKGROUND

In a drawing process or a bending process of a metallic plate, a press working is performed after placing a reinforcing plate (that is, a patch) on a base material of the metallic plate and welding the reinforcing plate to the base material to increase the strength of the metallic plate. In such a process, a difference in extension lengths is generated, due to the press working, between the reinforcing plate placed on the inner side of a curve created and the base material placed on the outer side of the curve. Consequently, a shear stress occurs at the welded portion of the reinforcing plate, which could result in causing the welded portion to break.

Japanese Unexamined Patent Application Publication No. 2023-102761 discloses a method of manufacturing a molded product that includes a top plate, two vertical walls, and curved portions situated between the top plate and the two vertical walls by placing a main body blank material on a reinforcing blank material, welding them together, and performing a press working on the welded materials. In this manufacturing method, joining portions are disposed at portions of the main body blank material and the reinforcing blank material that correspond to the two vertical walls before performing the press working. Additionally, prior to the welding, protrusions are formed on the main body blank material, which is to be situated on the outer side of curves to be created, to inhibit the joining portions from breaking. The molded product is manufactured such that the curved portions are formed at the locations where the protrusions are disposed.

SUMMARY

As an alternative method of inhibiting the joining portions of two pieces of welded plate materials from breaking, the following method can be considered for example. That is, disposing the joining portions, in advance, only at portions of two plate materials corresponding to the top plate without disposing any joining portions at portions of the two plate materials corresponding to the vertical walls, performing the press working on the two plate materials, and then disposing the joining portions on the vertical walls.

However, according to this alternative method, there may be a gap formed between the two plate materials at the vertical walls due to a difference in the amount of springback between the two plate materials after the press working. In a case where such a gap is formed, there has been a problem that it tends to be difficult to weld the two plate materials at the vertical walls after performing the press working.

One aspect of the present disclosure is to provide a method of manufacturing a molded product that can facilitate forming of the joining portions of two pieces of welded plate materials while inhibiting the joining portions from breaking.

One aspect of the present disclosure is a method of manufacturing a molded product. This method includes welding an inner metallic plate to an outer metallic plate after placing the inner metallic plate and the outer metallic plate on each other to form a first joining portion and, bending, after forming the first joining portion, the outer metallic plate with the inner metallic plate in a first direction by performing a first press working. Furthermore, the method includes bending, after the first press working, the outer metallic plate with the inner metallic plate in a second direction, which is opposite from the first direction, by performing a second press working. In the second press working, a first surface, a second surface which extends in a direction intersecting with the first surface, and a curved portion which couples the first surface to the second surface and on which the inner metallic plate is placed are formed on the outer metallic plate. In the first press working, at least one oppositely curved portion which is bent in a direction opposite from a bending direction of the curved portion and on which the inner metallic plate is placed is formed on the outer metallic plate. The at least one oppositely curved portion is formed to overlap an area on the outer metallic plate that is to be the curved portion. The inner metallic plate is situated on an outer side of the at least one oppositely curved portion after the first press working is performed and is situated on an inner side of the curved portion after the second press working is performed. The first joining portion is a portion where the inner metallic plate is welded to an area on the outer metallic plate that is to be the first surface.

In such a configuration, stress is less likely to be concentrated on the first joining portion even if the difference in extension lengths is generated between the outer metallic plate and the inner metallic plate as a result of the outer metallic plate being bent with the inner metallic plate in the first press working and the second press working. Since the outer metallic plate and the inner metallic plate are bent in the first direction first before being bent in the second direction, the gap between the inner metallic plate and the second surface of the outer metallic plate is likely to be reduced after the second press working is performed even when the springback occurs in the outer metallic plate and the inner metallic plate due to the bending in the second direction. Accordingly, a joining portion that may be formed between the inner metallic plate and the second surface of the outer metallic plate can be easily formed while the breakage of the first joining portion in the welded two metallic plates is inhibited.

One aspect of the present disclosure may further include welding the outer metallic plate to the inner metallic plate after the second press working is performed to form a second joining portion where the inner metallic plate is welded to the second surface of the outer metallic plate.

According to such a configuration, the second joining portion is formed in a condition where the second joining portion is less likely to be affected by the difference in the extension lengths between the outer metallic plate and the inner metallic plate caused by the second press working. Thus, it is possible to reduce the occurrence of a breakage in the second joining portion. In addition, the second joining portion is formed in a condition where the gap between the inner metallic plate and the second surface of the outer metallic plate after the second press working is performed is reduced. Thus, the second joining portion is easily formed.

In one aspect of the present disclosure, the inner metallic plate may include at least one auxiliary cover that overlaps the at least one oppositely curved portion after the first press working is performed and at least one cover that overlaps the curved portion after the second press working is performed. The at least one cover may include a first end situated on the first surface and a second end situated on the second surface. The at least one oppositely curved portion may be formed such that the length from a position on the inner metallic plate that is to be the first end of the at least one cover to an end of the at least one auxiliary cover situated in an area on the outer metallic plate that is to be the second surface is longer than the length from the first end to the second end of the at least one cover.

In such a configuration, a portion of the at least one auxiliary cover in the vicinity of the end of the at least one auxiliary cover situated in the area on the outer metallic plate that is to be the second surface, which is curved and deformed in the first direction in the first press working, is substantially linearly extended in the second press working. This facilitates springback that presses the inner metallic plate onto the second surface of the outer metallic plate. Accordingly, the gap between the inner metallic plate and the second surface of the outer metallic plate after the second press working can be further reduced.

In one aspect of the present disclosure, the at least one oppositely curved portion may be formed such that a first bending angle of the at least one oppositely curved portion is larger than a second bending angle of the curved portion. The first bending angle may be an angle formed by a first tilted line with respect to a crossline on a cross-section taken along a direction in which the first surface, the curved portion, and the second surface are aligned. The first tilted line is situated along the auxiliary opposite surface that forms an area on an opposite side from an area on the outer metallic plate that is to be the second surface. The crossline intersects an area on the outer metallic plate that is to be the first surface substantially perpendicularly. On the cross-section, the second bending angle may be an angle formed by a second tilted line with respect to the crossline. The second tilted line is situated along the opposite surface of the outer metallic plate which is on an opposite side from the second surface of the outer metallic plate.

According to such a configuration, interference between a portion of the outer metallic plate including an area that is to be the second surface after the first press working and a press mold used in the second press working can be inhibited when performing the second press working.

In one aspect of the present disclosure, the at least one oppositely curved portion may be formed such that an end of the at least one oppositely curved portion situated in an area on the outer metallic plate that is to be the first surface is situated closer to an area on the outer metallic plate that is to be the second surface than a position on the outer metallic plate that is to be an end of the curved portion on the first surface is.

According to such a configuration, a curved and deformed portion is less likely to be generated in the area on the outer metallic plate that is to be the first surface by the first press working. Thus, it is possible to inhibit a bending tendency in the first direction from staying on the first surface when performing the second press working.

BRIEF DESCRIPTION OF THE DRAWINGS

Example embodiments of the present disclosure will be described hereinafter with reference to the accompanying drawings, in which.

DETAILED DESCRIPTION OF EXEMPLARY EMBODIMENTS

1. Configuration of Molded Product

Figure 1:
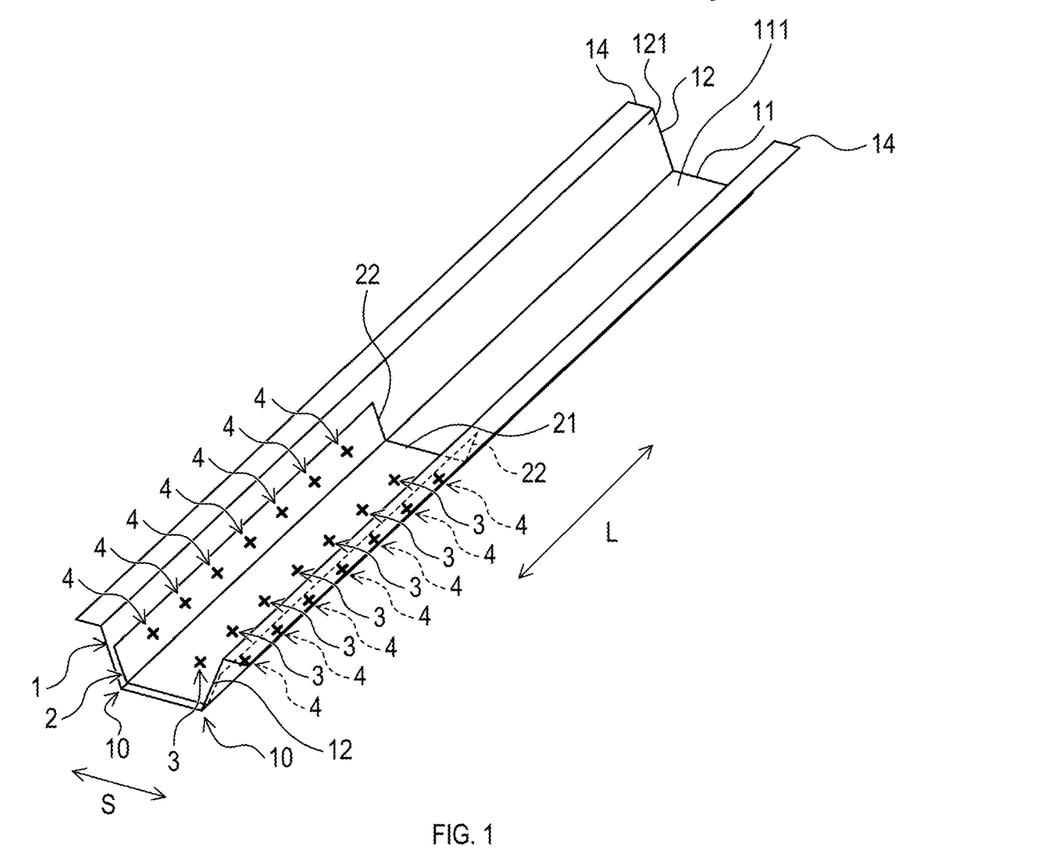
FIG. 1 is a perspective view schematically showing a molded product.
Figure 2:
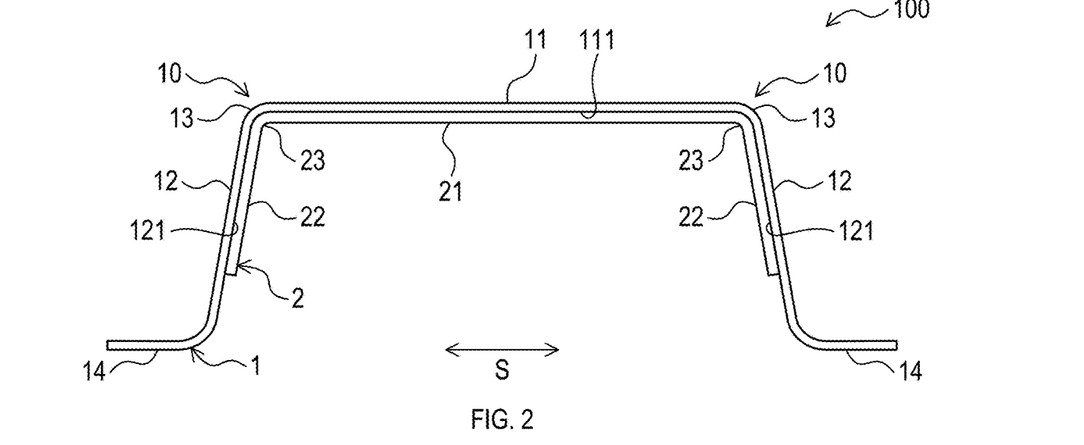
FIG. 2 is a side view schematically showing the molded product.

A molded product 100 shown in FIG. 1 and FIG. 2 is formed by performing a welding process and a bending process including press working on a blank material which is a plate material prepared by placing a first metallic plate 1 and a second metallic plate 2 on each other (hereinafter simply referred to as "blank material").

The molded product 100 is a plate-shaped member extending in a longer direction L and includes corner portions 10. The corner portions 10 are formed by pressing the blank material in a thickness direction. In the present embodiment, a cross-sectional shape of the molded product 100 taken along a shorter direction S which is perpendicular to the longer direction L (hereinafter simply referred to as "cross-sectional shape", is a hat-like shape. The hat-like shape is a shape including two sidewalls facing each other, a ceiling wall that is coupled to the two sidewalls on their first end sides, and two flanges disposed at second end sides of the sidewalls situated opposite from the first end sides such that the two flanges extend away from each other. A cross-section taken along the shorter direction S can also be described as a cross-section taken along a direction along which a first surface 111, a curved portions 13, and a second surface 121, all of which will be mentioned later, are aligned.

The molded product 100 is used as, for example, a component of a car body. In the present embodiment, the molded product 100 is a rocker disposed at a lower part of a side surface of a car. The molded product may be a front pillar, a center pillar, or the like for example. The molded product 100 includes the first metallic plate 1, the second metallic plate 2, first joining portions 3, and second joining portions 4.

<First Metallic Plate>

The first metallic plate 1 is made of a steel plate, for example. In the present embodiment, as shown in FIG. 2, the first metallic plate 1 has a hat-like cross-sectional shape. The first metallic plate 1 includes a ceiling wall 11, two sidewalls 12, two curved portions 13, and two flanges 14.

A plate surface of the ceiling wall 11 extends in directions intersecting with plate surfaces of the two sidewalls 12 that face with each other at an interval. The ceiling wall 11 includes the first surface 111. Each of the sidewalls 12 includes the second surface 121 that extends in a direction intersecting with the first surface 111. Among the plate surfaces of the ceiling wall 11, the first surface 111 extends to meet with inner surfaces of the curved portions 13, which will be mentioned later. Among the plate surfaces of the sidewalls 12, the second surfaces 121 extend to meet with inner surfaces of the curved portions 13, which will be mentioned later.

The curved portions 13 are situated between the ceiling wall 11 and each of the sidewalls 12 and are bent through the bending process of the first metallic plate 1. The curved portions 13 form the corner portions 10 of the molded product 100. Each curved portion 13 couples the first surface 111 of the ceiling wall 11 to the second surface 121 of the sidewall 12.

Each flange 14 is formed by bending an end portion of the sidewall 12 situated distant from the ceiling wall 11 through the bending process of the first metallic plate 1. The plate surfaces of each flange 14 extends in a direction intersecting with the plate surface of the sidewall 12.

<Second Metallic Plate>

Similar to the first metallic plate 1, the second metallic plate 2 is made of a steel plate, for example. Materials of the first metallic plate and the second metallic plate are not particularly limited. The first metallic plate and the second metallic plate may be made of different materials. In the present embodiment, the second metallic plate 2 has a U-shaped cross-section.

The second metallic plate 2 is placed on and welded to the first metallic plate 1. The second metallic plate 2 is disposed across the ceiling wall 11, the two sidewalls 12, and the two curved portions 13 of the first metallic plate 1. In the present embodiment, the second metallic plate 2 overlaps the first surface 111, the second surfaces 121 of the sidewalls 12, and the inner surfaces of the curved portions 13 of the first metallic plate 1. In other words, the second metallic plate 2 is situated on the inner side of the curved portions 13 of the first metallic plate 1 and welded to the first metallic plate 1 so as to overlap the curved portions 13 from their inner side. In the present embodiment, the length of the second metallic plate 2 in the longer direction L is shorter than that of the first metallic plate 1, and thus the second metallic plate 2 overlaps only a part of the first metallic plate 1 along the longer direction L. The length of the second metallic plate in the longer direction L may be substantially the same as that of the first metallic plate, and thus the second metallic plate may overlap the entirety of the first metallic plate from one end to the other end along the longer direction L.

The second metallic plate 2 includes a first cover 21, two second covers 22, and two third covers 23.

The first cover 21 is a portion that overlaps the first surface 111 of the first metallic plate 1.

The second covers 22 are portions that overlap the second surfaces 121 of the first metallic plate 1.

The third covers 23 are portions that overlap the inner surfaces of the curved portions 13 of the first metallic plate 1. Each of the third covers 23 couples the first cover 21 to one of the second covers 22. Each of the third covers 23 forms one of the corner portions 10 of the molded product 100 together with one of the curved portions 13 of the first metallic plate 1.

In the present embodiment, as one example, tensile strength of the first metallic plate 1 of the molded product 100 is more than or equal to 980 MPa, and the thickness of the second metallic plate 2 situated on the inner side of the curved portions 13 is made thicker than the thickness of the first metallic plate 1. The tensile strength of the first metallic plate is not limited to the value mentioned above. The thicknesses of the first metallic plate and the second metallic plate are also not particularly limited. The thickness of the first metallic plate may be the same as the thickness of the second metallic plate, or they may be different.

<First Joining Portion>

Figure 3A:
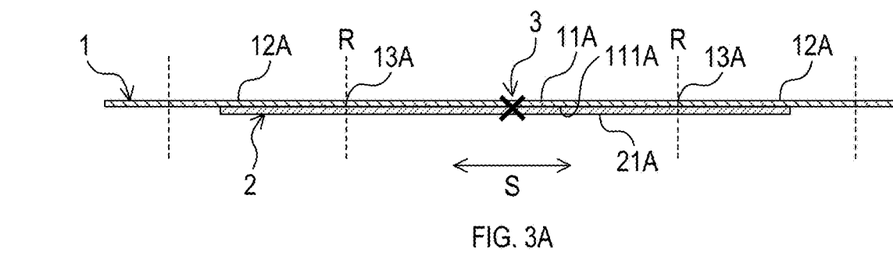
FIG. 3A is a schematic cross-sectional view taken at a first joining portion of a blank material along a shorter direction after a prior welding step.

As shown in FIG. 1, in the molded product 100, the first joining portions 3 are portions at which the first cover 21 of the second metallic plate 2 is welded to the first surface 111 of the first metallic plate 1. Details will be mentioned later, but the first joining portions 3 are formed before the bending process of the blank material in the present embodiment. Thus, as shown in FIG. 3A, the first joining portion 3 is a portion where a portion 21A of the second metallic plate 2, which is to be the first cover 21, is welded to a first area 111A of the first metallic plate 1, which is to be the first surface 111, in the blank material. There are two or more first joining portions 3. As shown in FIG. 1, the first joining portions 3 are aligned in the longer direction L and spaced apart from one another. The two or more first joining portions 3 may be disposed so as to be aligned in the shorter direction S.

<Second Joining Portion>

In the molded product 100, the second joining portions 4 are portions at which the second covers 22 of the second metallic plate 2 are welded to the second surfaces 121 of the first metallic plate 1. Details will be mentioned later, but unlike the first joining portions 3, the second joining portions 4 are formed after the bending process of the blank material in the present embodiment. There are two or more second joining portions 4. The second joining portions 4 are aligned in the longer direction L and spaced apart from one another. The two or more second joining portions 4 may be disposed so as to be aligned in the shorter direction S.

Each of the first joining portions 3 and the second joining portions 4 is, for example, made of a nugget formed at a welding point of the spot welding. Each of these joining portions may pass through the first metallic plate or the second metallic plate.

2. Method of Manufacturing a Molded Product

A method of manufacturing the aforementioned molded product 100 will be explained next with reference to FIG. 3A to FIG. 3D and FIG. 4 to FIG. 6. The method of manufacturing the molded product 100 includes a prior welding step S10, a first bending step S20, a second bending step S30, and a posterior welding step S40.

<Prior Welding Step>

First of all, as shown in FIG. 3A, the second metallic plate 2 having a flat plate shape is placed on and welded to the first metallic plate 1 having a flat plate shape to form the first joining portion 3. More specifically, the second metallic plate 2 is placed on the first metallic plate 1 before the bending process such that the second metallic plate 2 is situated over a first portion 11A, which is to be the ceiling wall 11, two second portions 12A, which are to be the two sidewalls 12, and two third portions 13A, which are to be the two curved portions 13. Then, the first joining portion 3 is formed by, for example, spot welding the portion 21A of the second metallic plate 2, which is to be the first cover 21, to the first area 111A of the first metallic plate 1, which is to be the first surface 111 before the bending process.

<First Bending Step>

Figure 3B:
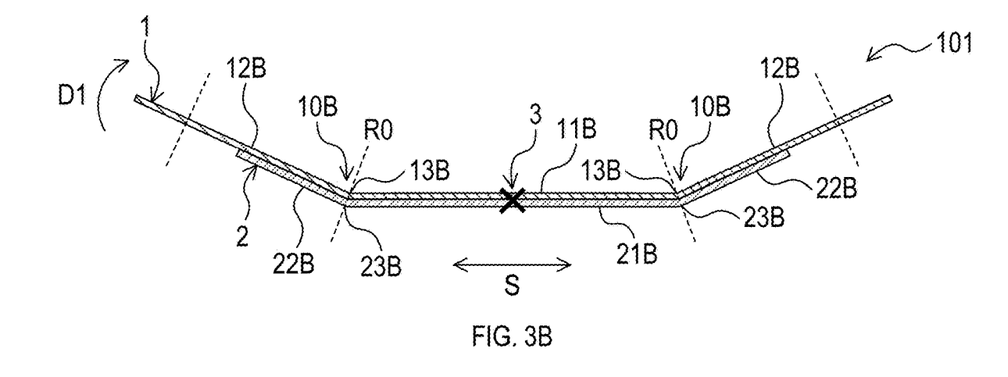
FIG. 3B is a schematic cross-sectional view taken at the first joining portion of the blank material along the shorter direction after a first bending step.

Then, as shown in FIG. 3B, after forming the first joining portion 3 as mentioned above, the auxiliary corner portions 10B are formed by bending the first metallic plate 1 with the second metallic plate 2 in a first direction D1. The first direction D1 is a bending direction opposite from a second direction D2, which is a bending direction for the bending process to mold the shape of the aforementioned molded product 100. Details will be mentioned later, but in the first bending step, the first metallic plate 1 and the second metallic plate 2 are bent in the first direction D1 to an extent where the first metallic plate 1 and the second metallic plate 2 plastically deform. Similar to the corner portions 10, the auxiliary corner portions 10B are formed by pressing the blank material in the thickness direction.

Figure 5:
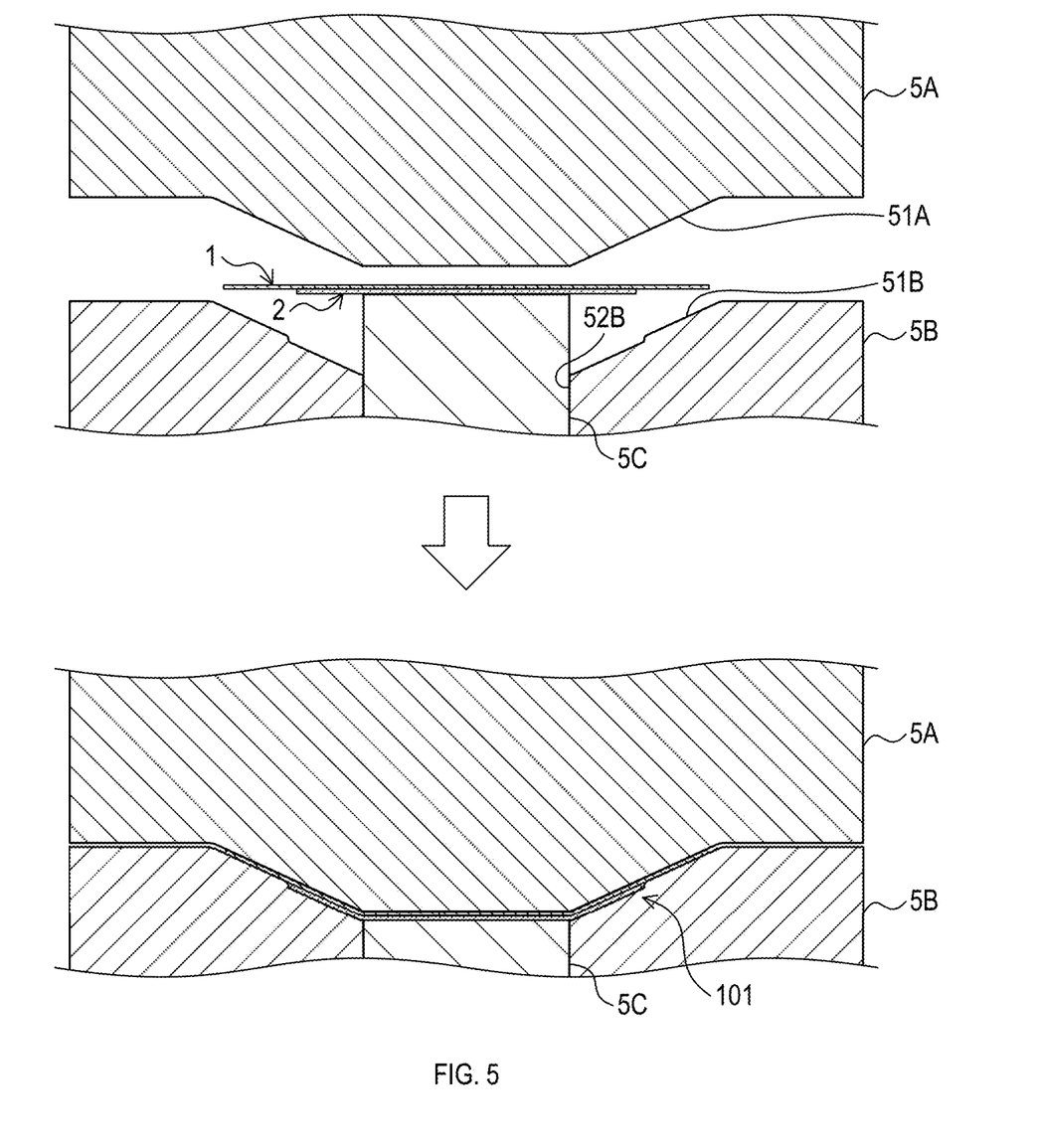
FIG. 5 is a diagram explaining the first bending step.

More specifically, the auxiliary corner portions 10B are formed by performing a first cold pressing on the welded blank material obtained in the prior welding step S10 using a first press mold 5A, a second press mold 5B, and a third press mold 5C as shown in FIG. 5. The blank material that includes the auxiliary corner portions 10B is also called an auxiliary molded product 101.

Accordingly, the first metallic plate 1 is pressed to form an auxiliary ceiling wall 11B, two auxiliary sidewalls 12B, and two oppositely curved portions 13B on the first metallic plate 1. Most of the auxiliary ceiling wall 11B becomes the ceiling wall 11 of the molded product 100. Most of the auxiliary sidewalls 12B becomes the sidewalls 12 of the molded product 100. Each of the oppositely curved portions 13B is situated between the auxiliary ceiling wall 11B and one of the auxiliary sidewalls 12B and is bent in a direction opposite from the direction in which the curved portions 13 is bent. On the first metallic plate 1 after the bending in the first direction D1, the oppositely curved portions 13B are formed such that they partially or entirely overlap areas of the first metallic plate 1 which are to be the curved portions 13. The oppositely curved portions 13B form the auxiliary corner portions 10B of the auxiliary molded product 101.

In addition, the second metallic plate 2 is bent along the auxiliary ceiling wall 11B, the auxiliary sidewalls 12B, and the oppositely curved portions 13B. Accordingly, a first auxiliary cover 21B, two second auxiliary covers 22B, and two third auxiliary covers 23B are formed on the second metallic plate 2. The first auxiliary cover 21B overlaps the auxiliary ceiling wall 11B. Each of the second auxiliary covers 22B overlaps one of the auxiliary sidewalls 12B. Each of the third auxiliary covers 23B overlaps an outer surface of one of the oppositely curved portions 13B. Each of the third auxiliary covers 23B couples one of the first auxiliary cover 21B with the corresponding one of the second auxiliary covers 22B. In other words, in the auxiliary molded product 101, the second metallic plate 2 is situated on the outer side of each of the oppositely curved portions 13B of the first metallic plate 1 and overlaps the first metallic plate 1 so as to cover the oppositely curved portions 13B from the outer side. The third auxiliary covers 23B form the auxiliary corner portions 10B of the auxiliary molded product 101 with the oppositely curved portions 13B.

As shown in FIG. 5, the first press mold 5A is situated above the second press mold 5B so as to face the second press mold 5B. The first press mold 5A includes, substantially at its center, a protruding portion 51A protruding towards the second press mold 5B. The protruding portion 51A includes surfaces which can be used to mold the auxiliary ceiling wall 11B, the two auxiliary sidewalls 12B, and the two oppositely curved portions 13B of the auxiliary molded product 101. The second press mold 5B includes a recessed portion 51B at a position facing the protruding portion 51A of the first press mold 5A. The protruding portion 51A can be fitted into the recessed portion 51B. The recessed portion 51B includes surfaces which can be used to mold the first auxiliary cover 21B, the two second auxiliary covers 22B, and the two third auxiliary covers 23B of the auxiliary molded product 101. The second press mold 5B includes a through hole 52B for the third press mold 5C to be inserted at a position facing a surface of the protruding portion 51A used for molding the auxiliary ceiling wall 11B. In other words, the through hole 52B is situated substantially at the center of the recessed portion 51B. The third press mold 5C is inserted into the through hole 52B of the second press mold 5B and disposed movable with respect to the second press mold 5B.

In the present embodiment, the welded blank material is placed between the first press mold 5A and the second press mold 5B, with the third press mold 5C inserted into the through hole 52B. The aforementioned auxiliary molded product 101 is molded by bringing the first press mold 5A and the second press mold 5B close to each other and having the protruding portion 51A fitted to the recessed portion 51B. At this time, the third press mold 5C is pushed by the protruding portion 51A and moves downwards.

<Second Bending Step>

Figure 3C:
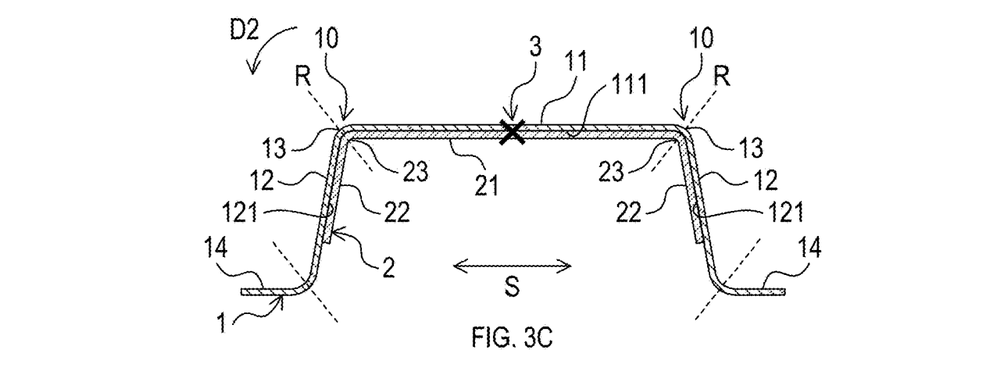
FIG. 3C is a schematic cross-sectional view taken at the first joining portion of the blank material along the shorter direction after a second bending step.

Next, as shown in FIG. 3C, the corner portions 10 are formed by bending the first metallic plate 1 with the second metallic plate 2 in the second direction D2 after finishing the aforementioned bending in the first direction D1 by performing the first cold pressing. More specifically, the corner portions 10 are formed by performing a second cold pressing on the bent blank material obtained in the first bending step S20 (in other words, the auxiliary molded product 101) using a fourth press mold 6A, a fifth press mold 6B, and a sixth press mold 6C show in FIG. 6.

Figure 6:
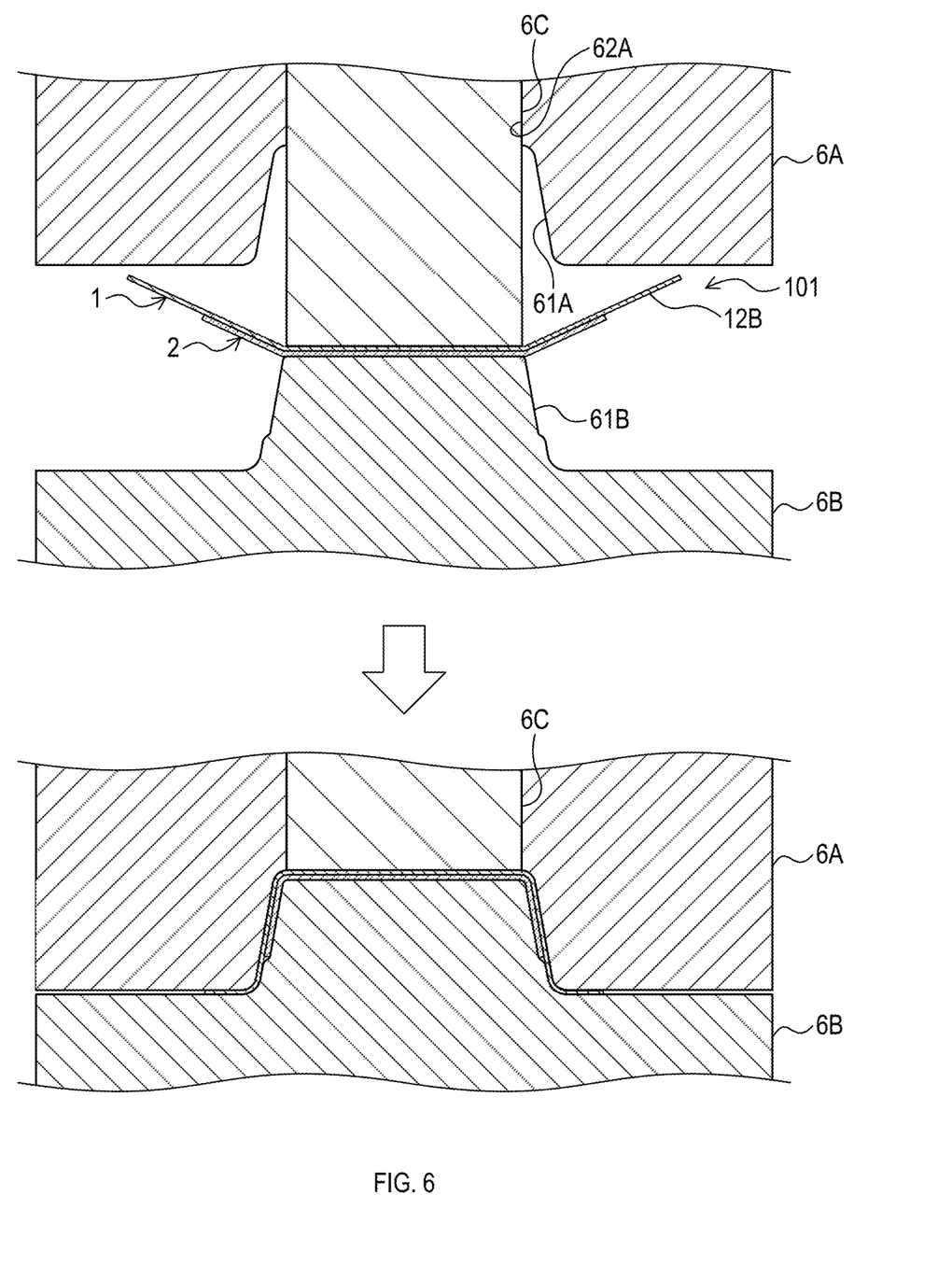
FIG. 6 is a diagram explaining the second bending step.

Accordingly, the first metallic plate 1 after the bending in the first direction D1 is pressed to form the ceiling wall 11 (that is, the first surface 111), the two sidewalls 12 (that is, the two second surfaces 121), the two curved portions 13, and the two flanges 14 on the first metallic plate 1.

In addition, the second metallic plate 2 after the bending in the first direction D1 is bent along the ceiling wall 11, the two sidewalls 12, and the two curved portions 13. This forms the first cover 21, the two second covers 22, and the two third covers 23 on the second metallic plate 2.

As shown in FIG. 6, the fourth press mold 6A is situated above the fifth press mold 6B so as to face the fifth press mold 6B. The fifth press mold 6B includes, substantially at its center, a protruding portion 61B protruding towards the fourth press mold 6A. The protruding portion 61B includes surfaces which can be used to mold the first cover 21, the two second covers 22, and the two third covers 23 of the molded product 100. The fourth press mold 6A includes a recessed portion 61A at a position facing the protruding portion 61B of the fifth press mold 6B. The protruding portion 61B can be fitted into the recessed portion 61A. The recessed portion 61A includes surfaces which can be used to mold the ceiling wall 11, the two sidewalls 12, the two curved portions 13, and the two flanges 14. The fourth press mold 6A includes a through hole 62A for the sixth press mold 6C to be inserted at a position facing a surface of the protruding portion 61B used for molding the first cover 21. In other words, the through hole 62A is situated substantially at the center of the recessed portion 61A. The sixth press mold 6C is inserted into the through hole 62A of the fourth press mold 6A and disposed movable with respect to the fourth press mold 6A.

In the present embodiment, the auxiliary molded product 101 is disposed between the fourth press mold 6A and the fifth press mold 6B, with the sixth press mold 6C being inserted into the through hole 62A, such that the auxiliary ceiling wall 11B and the first auxiliary cover 21B are interposed between the sixth press mold 6C and the protruding portion 61B of the fifth press mold 6B. At this time, the fourth press mold 6A is disposed above and away from the fifth press mold 6B so that the fourth press mold 6A does not interfere with the auxiliary sidewalls 12B of the auxiliary molded product 101. The blank material having the aforementioned corner portions 10 is molded by bringing the fourth press mold 6A and the fifth press mold 6B close to each other and having the protruding portion 61B fitted into the recessed portion 61A.

In other words, in the present embodiment, when the bending in the first direction D1 is performed on the blank material, and when each ridgeline R0 of the oppositely curved portions 13B of the first metallic plate 1 formed by this bending is a point of reference, only the plate surface situated on a first side of the ridgelines R0 (the inner surface of the auxiliary ceiling wall 11B) is joined to the second metallic plate 2 at the first joining portion 3. Meanwhile, the plate surfaces situated on second sides of the ridgelines R0 (the inner surfaces of the auxiliary sidewalls 12B), which are opposite sides from the first side with respect to the ridgelines R0 of the oppositely curved portions 13B, are not joined to the second metallic plate 2. When the bending in the second direction D2 is performed on the blank material that has the auxiliary corner portions 10B, and when each ridgeline R of the curved portions 13 of the first metallic plate 1 formed by this bending is a point of reference, only the plate surface situated on a first side of the ridgelines R (the first surface 111) is joined to the second metallic plate 2 at the first joining portion 3. Meanwhile, the plate surfaces situated on second sides (the second surfaces 121), which are opposite sides from the first side with respect to the ridgelines R of the curved portions 13, are not joined to the second metallic plate 2.

<Posterior Welding Step>

Figure 3D:
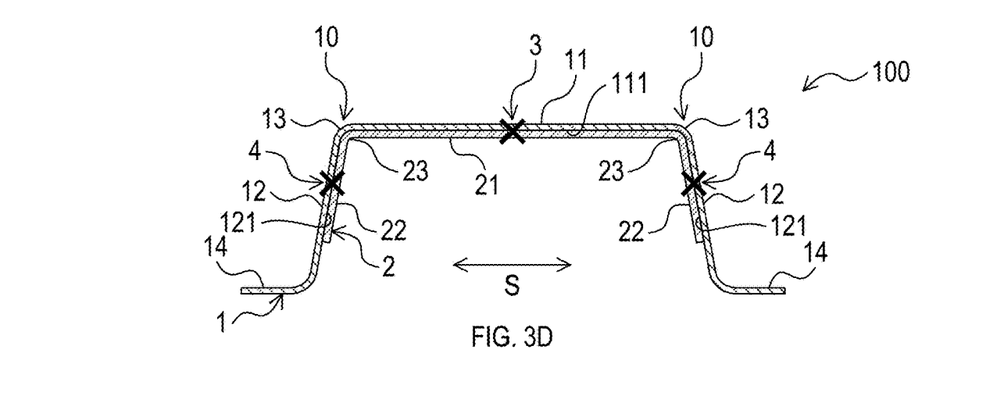
FIG. 3D is a schematic cross-sectional view taken at the first joining portion and second joining portions of the molded product, which is finished after a posterior welding step, along the shorter direction.
Figure 4:
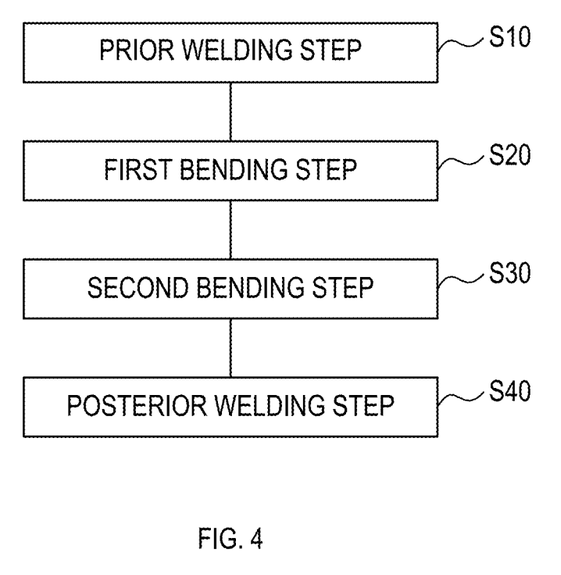
FIG. 4 is a flowchart showing a method of manufacturing the molded product.

Next, as shown in FIG. 3D, the first metallic plate 1 is further welded to the second metallic plate 2 to form the second joining portions 4 after finishing the aforementioned bending in the second direction D2 by performing the second cold pressing. In other words, the second joining portions 4 are formed on the bent blank material obtained in the second bending step S30. More specifically, the second joining portions 4 are formed by, for example, spot welding each of the second covers 22 of the second metallic plate 2, obtained through the bending in the second direction D2, to corresponding one of the second surfaces 121 of the first metallic plate 1.

As mentioned above, in the present embodiment, the molded product 100 can be manufactured by performing the prior welding step S10, the first bending step S20, the second bending step S30, and the posterior welding step S40 in this order.

3. Relationship Between Curved Portion and Oppositely Curved Portion

Next, the relationship between the curved portion 13 and the oppositely curved portion 13B will be explained with reference to FIG. 7.

Figure 7:
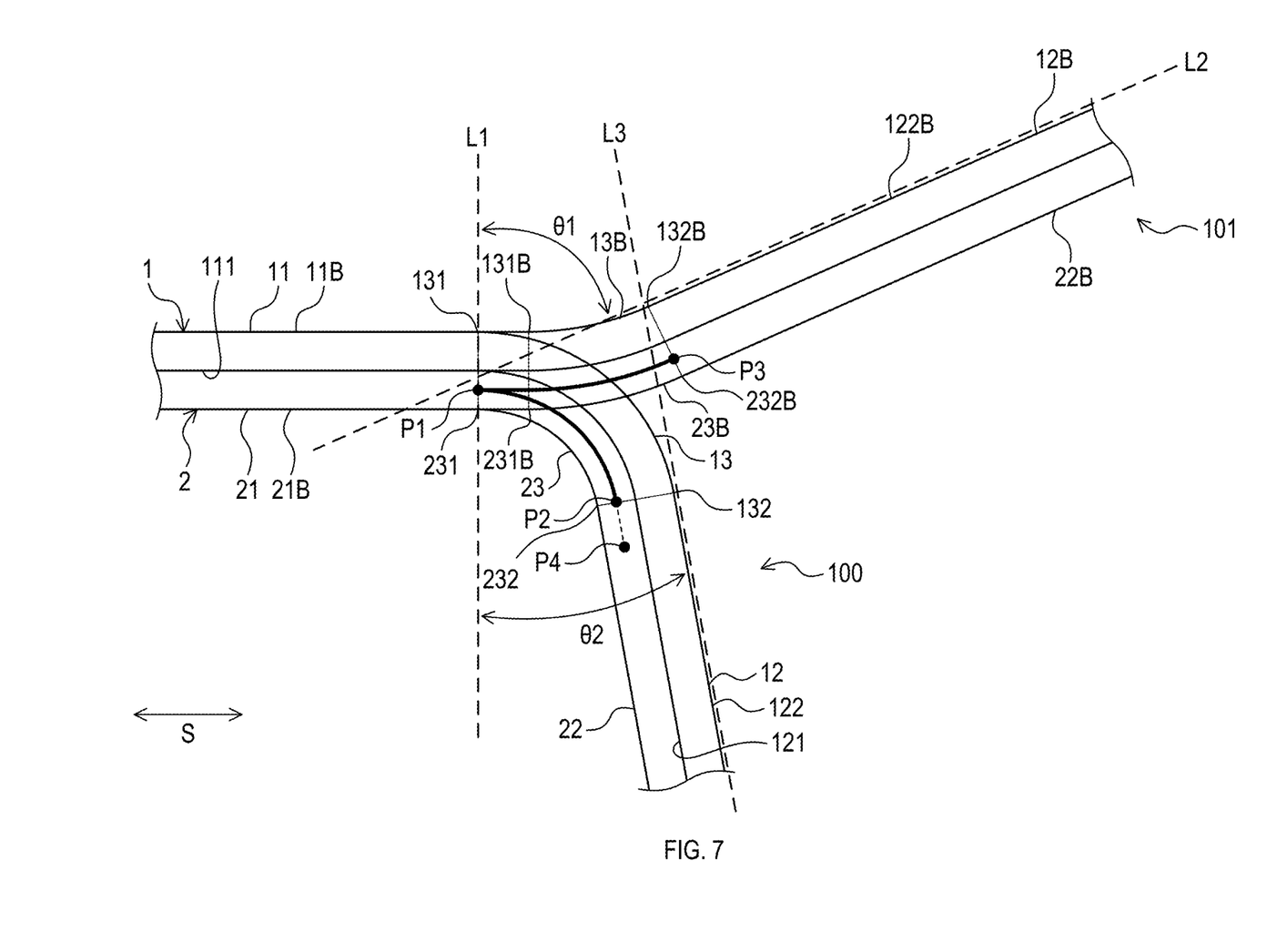
FIG. 7 is a diagram explaining a relationship between a curved portion and an oppositely curved portion.

As shown in FIG. 7, the curved portion 13 includes a first end 131 situated on the side of the ceiling wall 11 and a second end 132 situated on the side of the sidewall 12. The third cover 23 that overlaps the curved portion 13 includes a first end 231 situated on the side of the first cover 21 (that is, on the side of the first surface 111) and a second end 232 situated on the side of the second cover 22 (that is, on the side of the second surface 121).

The oppositely curved portion 13B includes a first end 131B situated on the side of the auxiliary ceiling wall 11B and a second end 132B situated on the side of the auxiliary sidewall 12B. The third auxiliary cover 23B that overlaps the oppositely curved portion 13B includes a first end 231B situated on the side of the first auxiliary cover 21B (that is, in an area of the first metallic plate 1 which is to be the first surface 111) and a second end 232B situated on the side of the second auxiliary cover 22B (that is, in an area of the first metallic plate 1 which is to be the second surface 121).

In the present embodiment, the oppositely curved portion 13B is formed to satisfy the following conditions (A) to (C) with respect to the curved portion 13.

(A) Concerning the second metallic plate 2, the length from the first end 231 of the third cover 23 to the second end 232B of the third auxiliary cover 23B is longer than the length from the first end 231 of the third cover 23 to the second end 232 of the third cover 23.

In the present embodiment, the center point of the first end 231 of the third cover 23 in plate thickness directions is named a middle point P1, and the center point of the second end 232 of the third cover 23 in the plate thickness directions is named a middle point P2, and the center point of the second end 232B of the third auxiliary cover 23B in the plate thickness directions is named a middle point P3. In this case, the oppositely curved portion 13B is formed such that the length from the middle point P1 to the middle point P3 in the auxiliary molded product 101 is longer than the length from the middle point P1 to the middle point P2 in the molded product 100. As one example that satisfies the aforementioned condition (A), the radius of curvature of the oppositely curved portion 13B in the auxiliary molded product 101 is preferably about 7 mm or more when the radius of curvature of the curved portion 13 in the molded product 100 is about 5 mm.

(B) A first bending angle $\theta1$ of the oppositely curved portion 13B is greater than a second bending angle $\theta2$ of the curved portion 13.

The first bending angle $\theta1$ is an angle formed by a first tilted line L2 with respect to a crossline L1 on a cross-section taken along the shorter direction S. On this cross-section, the crossline L1 intersects an area of the first metallic plate 1 that is to be the first surface 111 substantially perpendicularly (in other words, intersects the auxiliary ceiling wall 11B substantially perpendicularly). On the same cross-section, the first tilted line L2 is situated along an auxiliary opposite surface 122B (in other words, along the plate surface of the auxiliary sidewall 12B) that is an area on an opposite side from an area of the first metallic plate 1 that is to be the second surface 121.

On the same cross-section, the second bending angle $\theta2$ is an angle formed by a second tilted line L3 with respect to the crossline L1. On the same cross-section, the second tilted line L3 is situated along an opposite surface 122 which is on the opposite side from the second surface 121 of the first metallic plate 1 (in other words, along the plate surface of the sidewalls 12).

For example, in a case where the second bending angle θ2 of the curved portion 13 is about 10°, a gap between the outer surface of each of the second covers 22 and the corresponding one of the second surfaces 121 of the sidewalls 12 after the bending in the second direction D2 (hereinafter, simply referred to as "gap") is formed as follows with respect to the first bending angle θ1 of the oppositely curved portion 13B. The gap is measured at an approximate midpoint between an end of each second cover 22 on the side of the third cover 23 and the other end of each second cover 22. This midpoint is a position where the second joining portion 4 is assumed to be formed.

When the first bending angle θ1 is about 25°, the gap is about 1.86 mm. When the first bending angle θ1 is about 45°, the gap is about 1.63 mm. When the first bending angle θ1 is about 65°, the gap is about 2.17 mm. When the first bending angle θ1 is about 85°, the gap is about 2.61 mm. Note that when the first bending angle θ1 is about 0°, that is, when the bending in the first direction D1 is not performed, the gap is about 3.15 mm. Thus, when the second bending angle θ2 is 10°, the gap can be reduced by forming the oppositely curved portions 13B such that the first bending angle θ1 is 10° or more. When the second bending angle θ2 is about 10°, it is more preferable that the first bending angle θ1 is 25° or more and less than 50°.

(C) The first end 131B of the oppositely curved portion 13B is situated closer to the auxiliary sidewall 12B of the first metallic plate 1 than the first end 131 of the curved portion 13 is.

4. Effects

According to the embodiment described in detail above, the following effects can be obtained.

(4a) In the present embodiment, when the bending in the first direction D1 is performed on the blank material, and when each ridgeline R0 of the oppositely curved portions 13B of the first metallic plate 1 formed by this bending is a point of reference, only the inner surface of the auxiliary ceiling wall 11B situated on the first side of the ridgelines R0 is joined to the second metallic plate 2 at the first joining portion 3. Meanwhile, the inner surfaces of the auxiliary sidewalls 12B situated on the second sides of the ridgelines R0 of the oppositely curved portions 13B are not joined to the second metallic plate 2.

Moreover, when the bending in the second direction D2 is performed on the blank material that has the auxiliary corner portions 10B, and when each ridgeline R of the curved portions 13 of the metallic plate 1 formed by this bending is a point of reference, only the first surface 111 situated on the first side of the ridgelines R is joined to the second metallic plate 2 at the first joining portion 3. Meanwhile, the second surfaces 121 situated on the second sides of the ridgelines R of the curved portions 13 are not joined to the second metallic plate 2. As described above, the second joining portion 4 is not provided on the blank material in both of the bending processes.

Accordingly, the second metallic plate 2 is not easily bound to the area of the first metallic plate 1 that is to be the second surface 121 even if the difference in extension lengths is generated between the first metallic plate 1 and the second metallic plate 2 along the oppositely curved portions 13B as a result of the first metallic plate 1 being bent with the second metallic plate 2 in the first cold pressing. Likewise, the second metallic plate 2 is not easily bound to the second surface 121 of the first metallic plate 1 even if the difference in extension lengths is generated between the first metallic plate 1 and the second metallic plate 2 along the curved portions 13 as a result of the first metallic plate 1 being bent with the second metallic plate 2 in the second cold pressing. Therefore, stress is less likely to be concentrated on the first joining portion 3 in both of the cold pressing processes.

In the present embodiment, the first metallic plate 1 and the second metallic plate 2 are bent in the first direction D1 first before being bent in the second direction D2. This makes it easier to reduce the gap between the first metallic plate 1 and the second metallic plate 2, regardless of the material strength and combination of plate thicknesses of the two metallic plates, even when the springback occurs in the two metallic plates due to the bending in the second direction D2. Consequently, the second joining portions 4 can be easily formed.

In the present embodiment, the second joining portions 4 are formed on the blank material after the bending processes. Thus, the second joining portions 4 are formed in a condition where it is less likely to be affected by the difference in the extension lengths between the first metallic plate 1 and the second metallic plate 2 along the curved portions 13 caused by the second cold pressing.

Accordingly, the second joining portions 4 can be easily formed while breakages of the joining portion 3 and joining portions 4 on the welded first metallic plate 1 and second metallic plate 2 are inhibited.

(4b) In the present embodiment, the oppositely curved portions 13B are formed such that the length from the middle point P1 to the middle point P3 in the auxiliary molded product 101 is longer than the length from the middle point P1 to the middle point P2 in the molded product 100. In other words, the oppositely curved portions 13B are formed to satisfy the aforementioned condition (A). Thus, a portion of each third auxiliary cover 23B in the vicinity of the second end 232B, which is curved and deformed in the first direction D1 in the first cold pressing, is substantially linearly extended in the second cold pressing. More specifically, as shown in FIG. 7, the middle point P3 of the auxiliary molded product 101 is situated at the middle point P4 of the molded product 100 after the second cold pressing. Since the middle point P4 is situated on the sidewall 12 that extends substantially linearly, the molded product 100 extends substantially linearly between the middle point P2 and the middle point P4. This facilitates springback that presses the second metallic plate 2 onto the second surface 121 of the first metallic plate 1. Accordingly, the gap can be further reduced.

(4c) For example, when the first bending angle of the oppositely curved portion is less than or equal to the second bending angle of the curved portion, a warpage of the auxiliary sidewall against the auxiliary ceiling wall is likely to increase in the auxiliary molded product. Thus, the auxiliary sidewalls 12B are likely to interfere with the fourth press mold 6A used in the second cold pressing. Meanwhile, in the present embodiment, the oppositely curved portions 13B are formed such that the first bending angle θ1 of the oppositely curved portions 13B is larger than the second bending angle θ2 of the curved portions 13. In other words, the oppositely curved portions 13B are formed to satisfy the aforementioned condition (B). This reduces the warpage of the auxiliary sidewalls 12B against the auxiliary ceiling wall 11B in the auxiliary molded product 101. Accordingly, interference between the auxiliary sidewalls 12B of the auxiliary molded product 101 after the first cold pressing and the fourth press mold 6A used in the second cold pressing can be inhibited when performing the second cold pressing.

(4d) In the present embodiment, the first end 131B of the oppositely curved portion 13B is situated closer to the auxiliary sidewall 12B than the position on the first metallic plate 1 that is to be the first end 131 of the curved portion 13 is. In other words, the oppositely curved portions 13B are formed to satisfy the aforementioned condition (C). Accordingly, a curved and deformed portion is less likely to be generated in the first area 111A of the first metallic plate 1 by the first cold pressing. Thus, in the present embodiment, it is possible to inhibit a bending tendency in the first direction D1 from staying on the first surface 111 (that is, the ceiling wall 11) when performing the second cold pressing.

Figure 8:
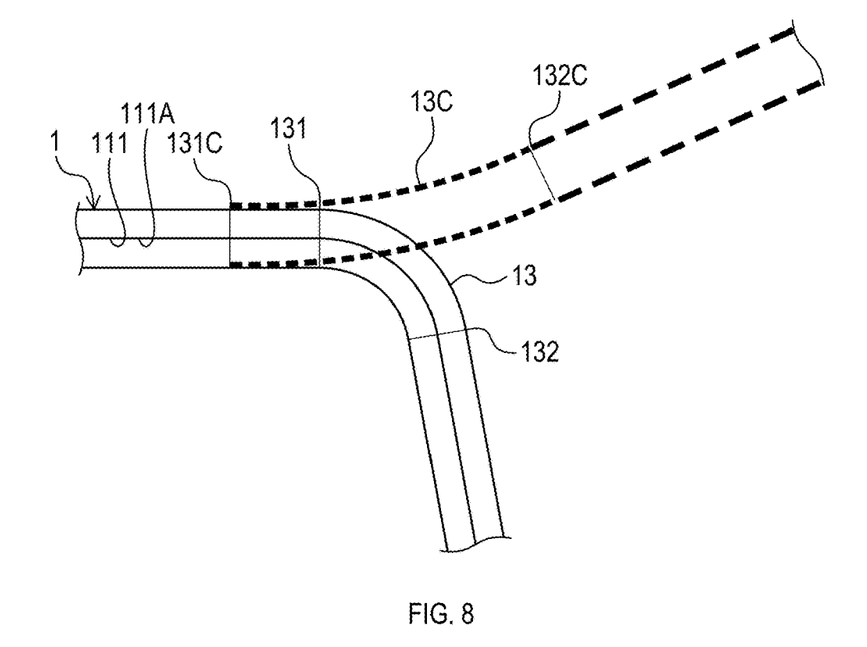
FIG. 8 is a diagram explaining an oppositely curved portion in a first comparative example.
Figure 9:
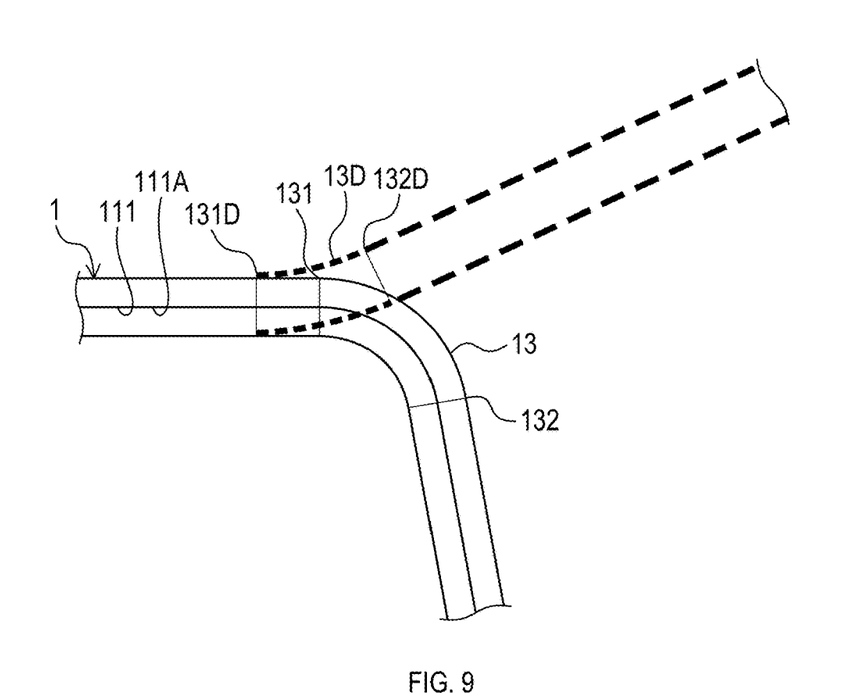
FIG. 9 is a diagram explaining an oppositely curved portion in a second comparative example.

When the condition (B) is satisfied but the condition (C) is not satisfied as seen in the oppositely curved portion 13C of the first comparative example and in the oppositely curved portion 13D of the second comparative example shown in FIG. 8 and FIG. 9 in a simplified manner, a curved and deformed portion is likely to be generated in the first area 111A of the first metallic plate 1 by the first cold pressing. As shown in FIG. 8 and FIG. 9, the first end 131C of the oppositely curved portion 13C and the first end 131D of the oppositely curved portion 13D are situated closer to the first area 111A of the first metallic plate 1, which includes the first surface 111 of the curved portion 13, than the first end 131 of the curved portion 13 is. Thus, when the oppositely curved portion 13C and oppositely curved portion 13D are formed as shown in FIG. 8 and FIG. 9, the bending tendency in the first direction D1 is likely to stay on the first surface 111 (that is, the ceiling wall 11) when performing the second cold pressing.

(4e) In the present embodiment, as one example, the molded product 100 is configured such that the tensile strength of the first metallic plate 1 is 980 MPa or more and that the thickness of the second metallic plate 2 at the inner side of the curved portions 13 is greater than the plate thickness of the first metallic plate 1. In such a configuration, the gap is likely to increase if the first bending step S20 is not performed before the second bending step S30. However, in the present embodiment, since the first bending step S20 is performed before the second bending step S30, the gap is more likely to be reduced.

In the present embodiment, the first metallic plate 1 corresponds to one example of an outer metallic plate, and the second metallic plate 2 corresponds to one example of an inner metallic plate. The first surface 111 of the ceiling wall 11 corresponds to one example of the first surface, and the second surface 121 of the sidewall 12 corresponds to one example of the second surface, and the first area 111A of the first metallic plate 1 corresponds to one example of an area on the outer metallic plate that is to be the first surface. The third auxiliary cover 23B corresponds to one example of an auxiliary cover, and the third cover 23 corresponds to one example of a cover. The first end 231 of the third cover 23 corresponds to one example of a first end of the cover, and the second end 232 of the third cover 23 corresponds to one example of a second end of the cover. The second end 232B of the third auxiliary cover 23B corresponds to one example of an end portion of the auxiliary cover situated in an area in the outer metallic plate that is to be the second surface. The first end 131B of the oppositely curved portions 13B corresponds to an example of an end portion of the oppositely curved portion situated in an area on the outer metallic plate that is to be the first surface.

5. Other Embodiments

Although the embodiment of the present disclosure has been explained above, it is needless to say that the present disclosure should not be limited to the aforementioned embodiment and may be implemented in various modifications.

Figure 10:
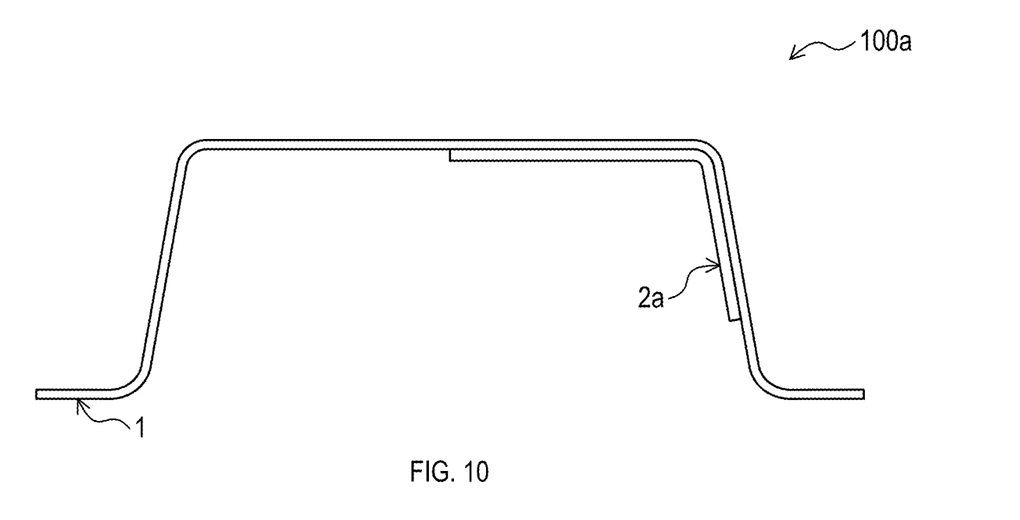
FIG. 10 is a schematic side view of the molded product in a first modified example taken along the shorter direction.

(5a) In the aforementioned embodiment, the cross-section of the second metallic plate 2 is U-shaped. The cross-section of the second metallic plate 2a of the molded product 100a may be L-shaped as shown in the first modified example in FIG. 10. In this case, in the first bending step, the bending in the first direction D1 may be performed only on a portion of the welded blank material where the second metallic plate 2a overlaps. In addition, although the illustration is omitted, an oppositely curved portion may be formed on the first metallic plate 1, and a third cover may be formed on the second metallic plate 2. In other words, the bending in the first direction D1 does not have to be performed on a portion of the welded blank material where the second metallic plate 2a does not overlap. The effects same as the effects (4a) to (4d) of the aforementioned embodiment can be obtained also in these cases.

Figure 11:
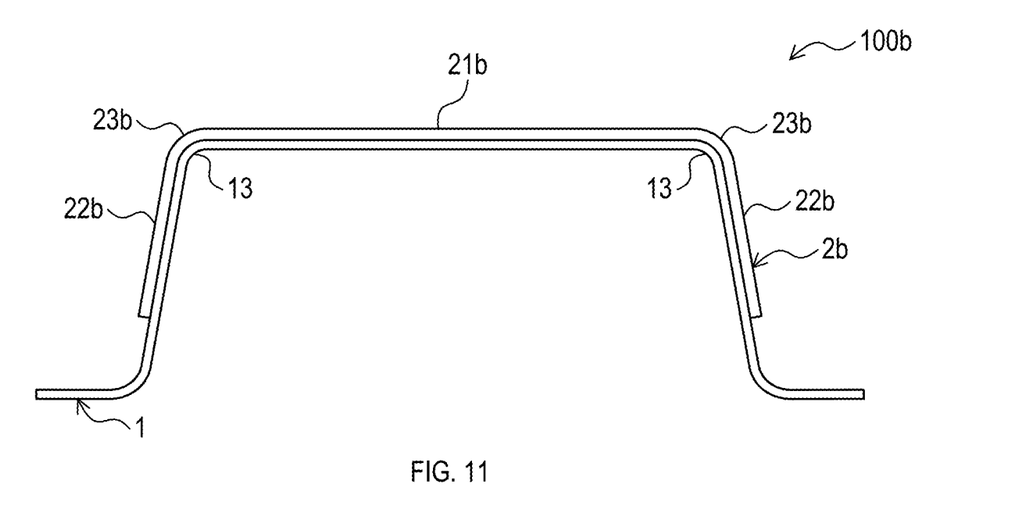
FIG. 11 is a schematic side view of the molded product in a second modified example taken along the shorter direction.

(5b) In the aforementioned embodiment, the second metallic plate 2 is situated on the inner side of the curved portions 13 of the first metallic plate 1 and is welded to the first metallic plate 1 so as to overlap the curved portions 13 from the inner side. However, as seen in the molded product 100b of the second modified example shown in FIG. 11, for example, the second metallic plate 2b may be situated on the outer side of the curved portions 13 of the first metallic plate 1 and welded to the first metallic plate 1 so as to overlap the curved portions 13 from the outer side. In other words, the second metallic plate 2b may be placed on the outer surfaces of the curved portions 13. In the case of the molded product 100b shown in FIG. 11, the first metallic plate 1 corresponds to an example of the inner metallic plate, and the second metallic plate 2b corresponds to an example of the outer metallic plate. The inner surface of the first cover 21b corresponds to an example of the first surface; the inner surfaces of the second covers 22b correspond to an example of the second surface; the third covers 23b correspond to an example of the curved portions; the area of the second metallic plate 2b that is to be the inner surface of the first cover 21b corresponds to an example of an area on the outer metallic plate that is to be the first surface.

(5c) In the aforementioned embodiment, in the prior welding step, the first joining portion 3 is formed by welding the portion 21A, which is a portion of the second metallic plate 2 before being bent that is to be the first cover 21, to the first area 111A, which is an area of the first metallic plate 1 that is to be the first surface 111. Then, the second joining portions 4 are formed in the posterior welding step by welding the second covers 22 of the second metallic plate 2 after the bending to the second surface 121 of the first metallic plate 1. However, welded portions formed in the prior welding step and the posterior welding step are not limited to those described above. For example, in the prior welding step, the first joining portion may be formed by welding an area of the second metallic plate 2 before bending that is to be one of the second covers 22 to an area of the first metallic plate 1 that is to be the second surface. Then, in the posterior welding step, the second joining portions may be formed by welding the first cover 21 of the second metallic plate 2, which has been bent, to the first surface 111 of the first metallic plate 1 and welding the second covers 22 to the second surfaces 121 of the first metallic plate 1 that overlap the second covers 22. In such a case, the effects similar to the effects (4a) to (4d) of the aforementioned embodiment can also be obtained.

(5d) In the aforementioned embodiment, the cross-section of the molded product 100 is hat-shaped. However, the cross-section of the molded product may be U-shaped or L-shaped.

(5e) In the aforementioned embodiment, the oppositely curved portions 13B are formed to satisfy all of the aforementioned conditions (A) to (C). However, the oppositely curved portion may be formed to satisfy at least one of the conditions (A) to (C). Even in such a case, the effect similar to at least the effect (4a) of the aforementioned embodiment can be obtained.

(5f) Functions of one element in the aforementioned embodiments may be distributed to two or more elements. Functions of two or more elements may be integrated into one element. A part of the configuration of the aforementioned embodiments may be omitted. At least a part of the configuration of the aforementioned embodiments may be added to or replaced with other configurations of the aforementioned embodiments.

What is claimed is:

1. A method of manufacturing a molded product, the method comprising:
   welding an inner metallic plate to an outer metallic plate after placing the inner metallic plate and the outer metallic plate on each other to form a first joining portion;
   bending, after forming the first joining portion, the outer metallic plate with the inner metallic plate in a first direction by performing a first press working; and
   bending, after the first press working, the outer metallic plate with the inner metallic plate in a second direction, which is opposite from the first direction, by performing a second press working,
   wherein, in the second press working, a first surface, a second surface which extends in a direction intersecting with the first surface, and a curved portion which couples the first surface to the second surface and on which the inner metallic plate is placed are formed on the outer metallic plate,
   wherein, in the first press working, at least one oppositely curved portion which is bent in a direction opposite from a bending direction of the curved portion and on which the inner metallic plate is placed is formed on the outer metallic plate,
   wherein the at least one oppositely curved portion is formed to overlap an area on the outer metallic plate that is to be the curved portion,
   wherein the inner metallic plate is situated on an outer side of the at least one oppositely curved portion after the first press working is performed and is situated on an inner side of the curved portion after the second press working is performed, and
   wherein the first joining portion is a portion where the inner metallic plate is welded to an area on the outer metallic plate that is to be the first surface.

2. The method of manufacturing a molded product according to claim 1, further comprising welding the outer metallic plate to the inner metallic plate after the second press working is performed to form a second joining portion where the inner metallic plate is welded to the second surface of the outer metallic plate.

3. The method of manufacturing a molded product according to claim 1,
   wherein the inner metallic plate includes
      at least one auxiliary cover that overlaps the at least one oppositely curved portion after the first press working is performed and
      at least one cover that overlaps the curved portion after the second press working is performed,
   wherein the at least one cover includes a first end situated on the first surface and a second end situated on the second surface, and
   wherein the at least one oppositely curved portion is formed such that a length from a position on the inner metallic plate that is to be the first end of the at least one cover to an end of the at least one auxiliary cover situated in an area on the outer metallic plate that is to be the second surface is longer than a length from the first end to the second end of the at least one cover.

4. The method of manufacturing a molded product according to claim 1,
   wherein the at least one oppositely curved portion is formed such that a first bending angle of the at least one oppositely curved portion is larger than a second bending angle of the curved portion,
   wherein the first bending angle is an angle formed by a first tilted line with respect to a crossline on a cross-section taken along a direction in which the first surface, the curved portion, and the second surface are aligned; the first tilted line being situated along an auxiliary opposite surface that forms an area on an opposite side from an area on the outer metallic plate that is to be the second surface; and the crossline intersecting an area on the outer metallic plate that is to be the first surface substantially perpendicularly, and
   wherein, on the cross-section, the second bending angle is an angle formed by a second tilted line with respect to the crossline; the second tilted line being situated along an opposite surface of the outer metallic plate which is on an opposite side from the second surface of the outer metallic plate.

5. The method of manufacturing a molded product according to claim 1,
   wherein the at least one oppositely curved portion is formed such that an end of the at least one oppositely curved portion situated in an area on the outer metallic plate that is to be the first surface is situated closer to an area on the outer metallic plate that is to be the second surface than a position on the outer metallic plate that is to be an end of the curved portion on the first surface is.

* * * * *